United States Patent
Aisa et al.

(10) Patent No.: US 9,791,877 B2
(45) Date of Patent: Oct. 17, 2017

(54) ELECTRICAL HOUSEHOLD APPLIANCE SYSTEM

(71) Applicant: INDESIT COMPANY S.P.A., Fabriano (Ancona) (IT)

(72) Inventors: Valerio Aisa, Fabriano (IT); Stefano Frattesi, Fabriano (IT)

(*) Notice: Subject to any disclaimer, the term of this patent is extended or adjusted under 35 U.S.C. 154(b) by 314 days.

(21) Appl. No.: 14/422,040

(22) PCT Filed: Aug. 20, 2013

(86) PCT No.: PCT/IB2013/056756
§ 371 (c)(1),
(2) Date: Feb. 17, 2015

(87) PCT Pub. No.: WO2014/030120
PCT Pub. Date: Feb. 27, 2014

(65) Prior Publication Data
US 2015/0220101 A1  Aug. 6, 2015

(30) Foreign Application Priority Data
Aug. 21, 2012  (IT) .............................. TO2012A0737

(51) Int. Cl.
*H02J 3/14* (2006.01)
*G05F 3/04* (2006.01)
(Continued)

(52) U.S. Cl.
CPC .................. *G05F 3/04* (2013.01); *H02J 3/00* (2013.01); *H02J 3/14* (2013.01); *H02J 13/0017* (2013.01);
(Continued)

(58) Field of Classification Search
CPC ............ G05F 1/66; G05B 15/02; G06Q 50/06
See application file for complete search history.

(56) References Cited

U.S. PATENT DOCUMENTS

2004/0037221 A1   2/2004  Aisa
2005/0099314 A1   5/2005  Aisa
(Continued)

FOREIGN PATENT DOCUMENTS

| EP | 1465320 A2 | 10/2004 |
|---|---|---|
| EP | 2189858 B1 | 5/2010 |
| WO | 0241585 A3 | 5/2002 |

OTHER PUBLICATIONS

"Connecting white goods to a home network at a very low cost", International Appliance Manufacturing 2004, Dec. 31, 2004, pp. 85 through 91. Authors: Valerio Aisa, Paolo Falcioni, Piero Pracchi. Wrap S.p.A., Italy.
(Continued)

*Primary Examiner* — Sibin Chen

(57) ABSTRACT

An electrical appliance having at least one electrical load, and a digital control system managing flows of electric current of supply of the at least one electrical load, wherein the digital control system of the electrical appliance transmits information to an external control device, wherein said information comprises first information regarding authorization or non-authorization for an interruption of the supply of electric voltage to the electrical appliance by the external control device, the digital control system of the electrical appliance generating the first information of its own operating state.

15 Claims, 5 Drawing Sheets

(51) Int. Cl.
*H02J 3/00* (2006.01)
*H02J 13/00* (2006.01)

(52) U.S. Cl.
CPC ..... *H02J 2003/143* (2013.01); *Y02B 70/3225* (2013.01); *Y02B 70/3266* (2013.01); *Y02B 90/2607* (2013.01); *Y04S 20/222* (2013.01); *Y04S 20/242* (2013.01); *Y04S 40/12* (2013.01); *Y10T 307/406* (2015.04)

(56) References Cited

U.S. PATENT DOCUMENTS

| | | | |
|---|---|---|---|
| 2010/0088261 A1 | 4/2010 | Montalvo | |
| 2011/0264286 A1 | 10/2011 | Park | |
| 2012/0119577 A1* | 5/2012 | Clarke | H02J 3/14 307/40 |
| 2014/0160810 A1* | 6/2014 | Zheng | H02M 3/33576 363/21.17 |

OTHER PUBLICATIONS

Italian Patent Application No. IT TO2012A000737, filed Aug. 21, 2012, Applicant: Indesit Company SPA. Italian Search Report dated May 17, 2013 re: same.

International Patent Application No. PCT/IB2013056756, filed Aug. 20, 2013, Applicant: Indesit Company SPA. International Publication No. WO2014030120A1, publication date: Feb. 27, 2014 re: same.

International Patent Application No. PCT/IB2013056756, filed Aug. 20, 2013, Applicant: Indesit Company SPA. International Search Report and Written Opinion, dated Jan. 27, 2014, re: same.

Italian Patent Application No. IT TO2012A000738, filed Aug. 21, 2012, Applicant: Indesit Company SPA. Italian Search Report dated May 17, 2013 re: same.

International Patent Application No. PCT/IB2013056761, filed Aug. 20, 2013, Applicant: Indesit Company SPA. International Publication No. WO20140301210A1, publication date: Feb. 27, 2014 re: same.

International Patent Application No. PCT/IB2013056761, filed Aug. 20, 2013, Applicant: Indesit Company SPA. International Search Report and Written Opinion, dated Jan. 27, 2014, re: same.

* cited by examiner

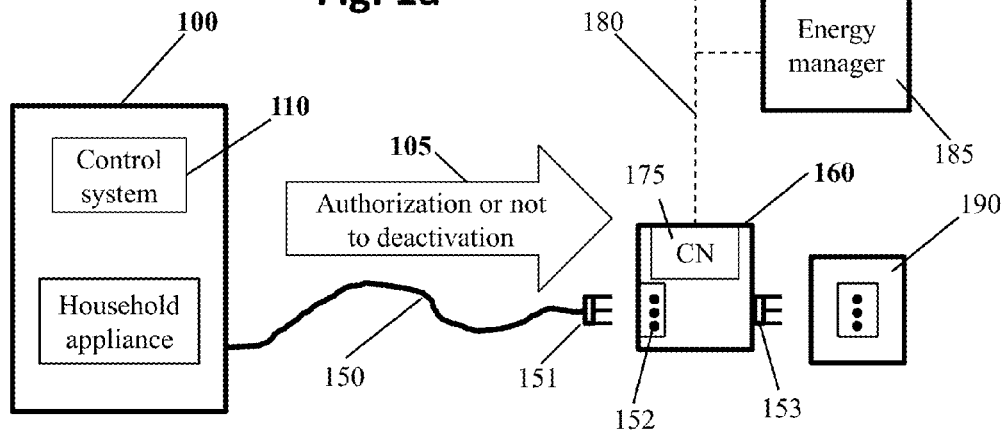
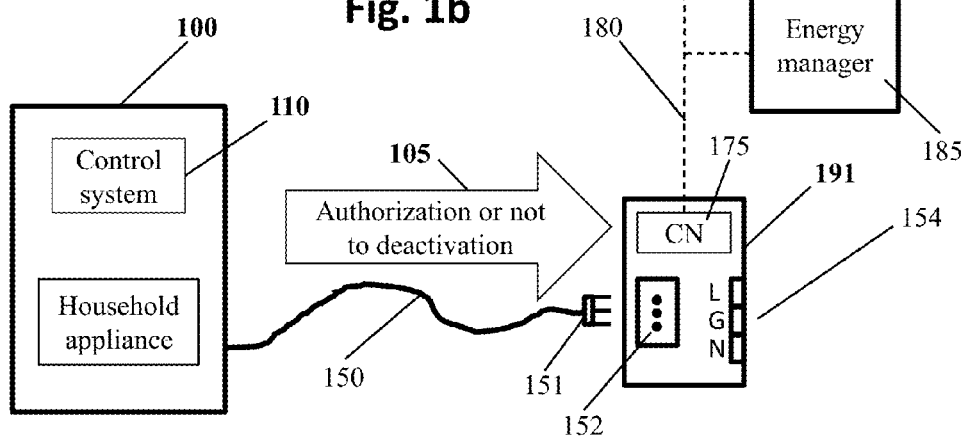
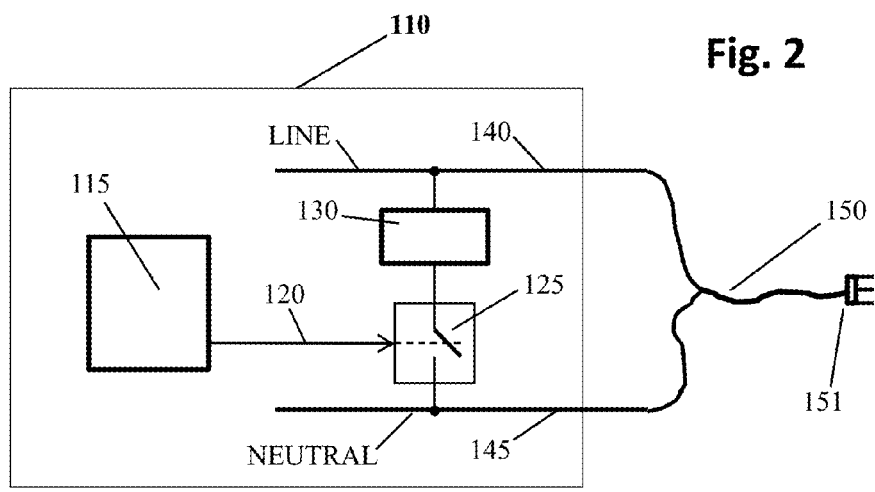

ELECTRICAL HOUSEHOLD APPLIANCE SYSTEM

RELATED APPLICATIONS

This application is the National Phase entry of International Application No. PCT/IB2013/056756 filed Aug. 20, 2013, which claims priority to Italian Patent Application No. TO2012000737 filed Aug. 21, 2012, the entireties of which are incorporated herein by reference.

FIELD OF THE INVENTION

The present invention relates to the field of electrical-household-appliance systems and has been developed with particular reference to systems aimed at managing domestic consumption of electrical energy.

PRIOR ART

The fast evolution in progress in systems for generating electrical energy, characterized by an increasing contribution of renewable energy sources, is rendering necessary and urgent a global review of systems for distribution of the energy produced, envisaging an increasing use of information and communication technologies (ICTs) for monitoring in real time the effective power available at each instant on the grid so as to guarantee, through appropriate corrective actions to be implemented according to need, maintenance of a constant balance between the electric power generated upstream and the power absorbed downstream by the various power-using systems, this balance being a guarantee of maximum efficiency and minimum environmental impact. The above corrective actions, which are necessary when the electric power available on the grid is less than the power required or else, vice versa, when there is an excess of power caused, for example, by an unexpected contribution of renewable energy sources (photovoltaic systems, wind-power systems, etc.), can substantially be implemented in the following two main ways: (1) through direct negotiation between the electric-power utility and the electrical appliances, which for this purpose must be provided with appropriate communication means and with adequate "intelligence"; or else (2) through the use of appropriate control devices ("smart plugs") provided with an electromechanical relay (device for the management in ON-OFF mode of the flow of the current delivered to an electrical load connected to the control device itself), which, being set between a household electrical appliance and the corresponding current socket and being directly controllable by the electric-power utility or by an energy-management system connected thereto, enable, upon command of the utility, deactivation or activation of the above electrical load in accordance, respectively, with situations of shortage or excess of electric power available in the grid.

With reference to the first case, it is necessary for the household electrical appliances, in particular electrical household appliances, to be able to adapt as much as possible their operation to the requirements of the grid, seeking to reduce or annul their own current consumption in peak periods and, vice versa, to exploit as far as possible the situations of greater availability of energy, at the same time safeguarding the quality of performance for the consumer. This can be obtained only if each electrical appliance is able to know constantly the situation of the grid so as to be able to adapt its own operation to the requirements of the latter, at the same time guaranteeing the quality of its final performance in regard the consumer: i.e., in practice, only if the aforesaid electrical appliance is provided with appropriate means for communicating directly with the system for management of the electric power grid and has available an appropriate control system capable of modifying the work cycle thereof according to the requirements of the grid itself. Electrical household appliances of this type are not yet present on the market, but the biggest world manufacturers of white goods have announced their intention to make them available shortly.

With reference to the second case, the supply of the household electrical appliances concerned would be managed through the aforesaid control device or smart plug, by activating the electrical appliance (for example, a boiler) when the grid has electric power in excess and deactivating it during shortage of the power available in the grid. The aforesaid management by the utility would obviously be regulated by an appropriate contract stipulated directly with the consumer.

Both of the methods for managing domestic electrical loads by the electric-power utility described above present limits.

In the first case, a major limit is represented by the fact that, for the method to be really effective, it must presuppose in the short term a massive presence in the field of latest-generation electrical household appliances, which, instead, requires somewhat long technical times because, since the process of change of the electrical household appliances already present in dwellings is linked to the useful working life thereof that in general amply exceeds some ten years, it is in effect slow and gradual. A further obstacle moreover derives from the fact that the aforesaid approach, which is based upon electrical-household-appliances that are able to communicate, depends heavily upon the complex problems of the communication standards, which, unfortunately, are still far from representing a practical solution. There exists, in fact, the need to have available well-defined communication rules shared by all the leading manufacturers of electrical household appliances (standard rules, ratified by international normative bodies) so as to guarantee the so-called "inter-operability" between products of different types and different brands, i.e., the possibility of establishing a common language of communication that will enable the consumer to choose freely from among "smart appliances" of different brands that will be progressively made available on the market in the near future. Tying an electrical household appliance down to a given communication technology represents, in fact, a very demanding decision, if it is not supported by rules that are certain and shared also by the direct competitors. Finally, there also exists the problem of the cost of communication technology, which, since it is not negligible, causes an increase of the industrial cost of the electrical household appliance, rendering it less competitive, and consequently tends to put the brake on diffusion of "smart appliances".

In the second case, there exists a serious problem that renders unsuitable and unadvisable in the majority of cases the use of the above external control devices as ON-OFF managers of electrical household appliances, namely, the fact that ON-OFF management of the supply of an electrical appliance can markedly jeopardize its performance, cause inefficiency, and at times even lead to damage to the product. For this reason, manufacturers of electrical household appliances and consumer organizations firmly oppose the use of external control devices, which, according to the requirements of the provider of electrical energy, interrupt supply of a household electrical appliance regardless of the operating step in which this happens to be operating at that moment.

EP 2189858 A1 discloses an electrical household appliance system comprising an electrical appliance, having a digital control system configured for enabling the performance of a plurality of pre-determined basic functionalities, and an auxiliary device, having means for acquiring and/or processing auxiliary information. The electrical appliance and the auxiliary device moreover comprise respective communication means, for setting up between them a bi-directional communication of data. The control system of the electrical appliance is prearranged for enabling execution of a DDC function (Dynamic Demand Control), being additional with respect to the basic functionalities. The control means of the auxiliary device are pre-arranged for processing and/or acquiring information concerning variations of grid frequency being significant for the execution of the DDC function, and to communicate this information to the control system of the electrical appliance.

The communication technique of the above cited document, named "Power Modulation", is also described in the article "*Connecting white goods to a home network at a very low cost*", V. Aisa, P. Falcioni e P. Pracchi, published on International Appliance Manufacturing, pp. 14-20, 2004. In this article it is also hypothized a mode of communication from a smart adapter to a household electrical appliance according to which information is transmitted by operating—via triac—certain delays with respect to the zero-crossing in the power supply of the electrical household appliance, said delays being applied at each single half-wave of the grid frequency. Basically, with such an hypothized solution, the smart adapter performs a transmission by altering the waveform of the supply voltage of the electrical household appliance (however, one such mode of transmission causes an unacceptable introduction in the grid of spurious harmonics of significant level, caused just by the deformation of the grid sinusoids and enhanced by the fact that the inlet impedance of an electrical household appliance is typically of a reactive type).

US 2012/0119577 A1 discloses a system wherein a smart power socket receives a request over a corresponding power line and generates in turn a second request, based on the received one. The second request is transmitted over a power cord connecting the smart socket to an electrical appliance. The electrical appliance generates a response and a power setting is identified therefrom. The smart socket regulates electrical current flowing from the smart socket to the electrical appliance using the identified setting. In a related approach of the solution, an electrical appliance receives a power down request, over its own power cord, from a smart power socket to which the cord is connected. The electrical appliance determines whether it still needs power supply in order to perform one or more functions thereof. The electrical appliance returns as a consequence a response to the smart socket, specifying whether such power down request can be accepted or not.

SUMMARY OF THE INVENTION

In its general terms, the present invention basically proposes a way to overcome the drawbacks of the prior art described above.

The above aim and further purposes still, which will emerge more clearly hereinafter, are achieved, according to the present invention, by an electrical household appliance system, by a method for controlling consumption of electrical energy in a domestic environment, by an electrical appliance and by a control device for an electrical household appliance system that present the characteristics specified in the annexed claims. The claims form an integral part of the technical teaching provided herein in relation to the invention.

In brief, the invention is based upon the use of a control device distinguished by the capacity for adapting to the operating state of the corresponding electrical appliance, using information provided thereby in a spontaneous manner, as well as upon a method that, using preferentially the same control electronics (110) already provided along with the electrical appliance (100), i.e., without adding any specific hardware component, enables the latter to send periodically and in a spontaneous way (i.e., by its own initiative, without any previous external request to this purpose) first information, regarding its "degree of deactivatability", i.e., its degree of availability to tolerate an interruption of its mains supply, without minimally altering the industrial cost of the product itself.

In a preferred embodiment, the above method is based upon the fact that the digital control system (110) of an electrical household appliance (100) is typically provided with means (115, 120, 125) for managing the flows of the grid current that supplies its internal electrical loads (130), connected between live (140) and neutral (145) through corresponding controlled switches (125)—represented by solenoid valves, pumps, motors, lamps, fans, and so forth—and consists in exploiting this characteristic for transmitting, through its own supply cable (150), first information representing its "degree of deactivatability" (105), this information being transmitted by means of controlled and appropriately encoded variations of the aforesaid current flows and being, in reception, acquired, decoded, and possibly sent on a network through the aid of an appropriate control device (160) located between a source of supply of the electrical household appliance, such as a current socket (190) of the domestic premises, to which the electrical household appliance itself is connected by means of a supply line of its own, such as its supply cable (150) with the corresponding plug (151).

For this purpose, the control device (160) is preferably provided with means (165, 166, 167) for measuring the variations of the grid current that supplies the electrical household appliance, means (170) for decoding the information encoded through the aforesaid variations of current, and possibly means (175) for making available the aforesaid information on a local communication network (180) to which the control device (160) is connected.

The information regarding the "degree of deactivatability" represents, according to the invention, a form of spontaneous authorization by the electrical household appliance to be deactivated or not from outside and is in strict relation with the operating state thereof: it is preferentially sent at each change of state of the electrical household appliance, and, during the operating step associated to a given state, it can be updated periodically.

Further advantages of the present invention are represented by the fact that the electrical household appliance, in addition to sending by its own initiative periodic information on the acceptability or otherwise of an interruption of their own supply, can also send, with the same technique, other types of information, such as for example the type of electrical household appliance (refrigerator, fridge-freezer, dish-washer, washing machine, dryer, oven, cooking hob, suction hood, and so forth), its own operating state, the events of interaction with the consumer, the statistical data on the frequency and modalities of use, and the diagnostic data generated by a possible system of self-diagnosis present within the control system itself of the electrical household appliance, as described in greater detail hereinafter.

Likewise, since the external control device or smart plug according to the invention is able to acquire and decode the aforesaid different types of information sent by the electrical household appliance connected thereto, it performs the role of enabler in regard to provision of new services based upon the contents of these different types of information.

The communication system provided according to the preferred embodiment of the invention differs sharply from known communication systems on powerline, because it does not require any specific transmission device but uses the same means already present in a digitally controlled electrical household appliance, and consequently does not entail additional costs for the product. As compared to a known powerline-based communication system, the one proposed in the framework of the present invention is hence distinguished by a simpler and more elementary technology, which, at the same time, presents the advantage of meeting fully the requirements of the applications at which it is aimed and of not weighing upon the cost of the electrical household appliance. Another related advantage of the invention is that the operation of the system leaves out of consideration of any communications or requests by a control device external to the electrical household appliance, the proposed solution being in fact implementable though a simple unidirectional communication, from the electrical household appliance to the external device, with clear advantages in terms of simplification and cost saving.

BRIEF DESCRIPTION OF THE DRAWINGS

The invention will be described in detail hereinafter with reference to the attached drawings, which are provided purely by way of non-limiting example and in which:

FIG. 1a illustrates the general architecture of the system according to one embodiment of the invention, where a control device external to an electrical household appliance (100) is a movable device (160) set between the supply cable (150) of the electrical household appliance itself and the corresponding current socket (190);

FIG. 1b illustrates the general architecture of the system according to another embodiment of the invention, where the function performed by the control device (160) of FIG. 1a is integrated within the current socket (191), which supplies the electrical household appliance;

FIG. 2 is a schematic illustration of the known control system of an electrical household appliance (100), highlighted in which is the mode of management of a generic electrical load (130);

FIG. 3a is a block diagram of the control device (160) of FIG. 1a;

FIG. 3b is the block diagram of the current socket (191) of FIG. 1b, englobing the function performed by the control device (160) of FIG. 1a;

DESCRIPTION OF PREFERRED EMBODIMENTS OF THE INVENTION

Figure 3A:
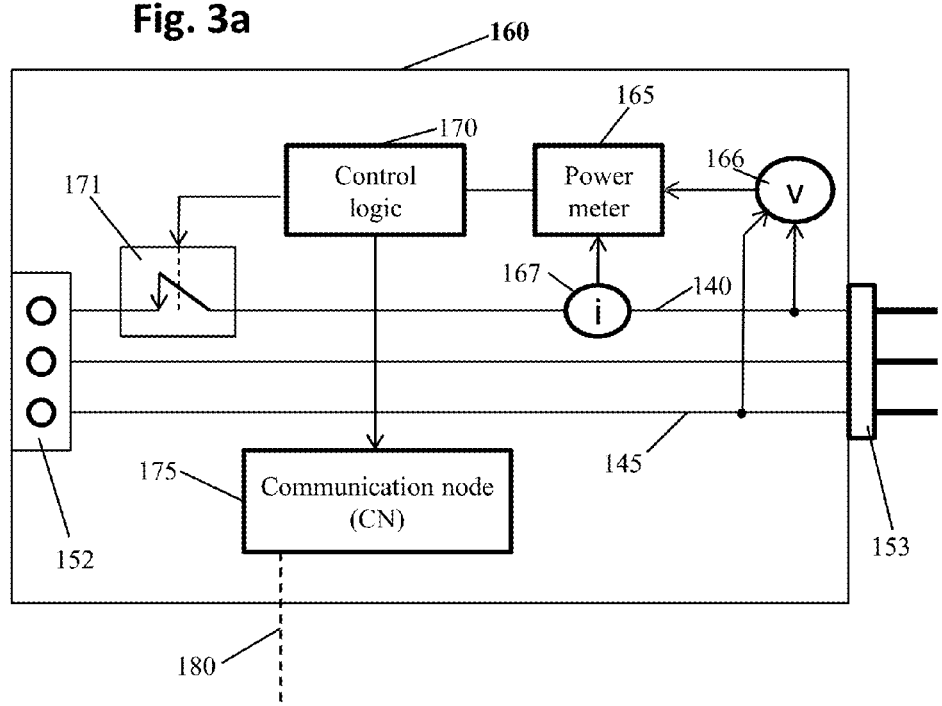

Illustrated in the ensuing description are various specific details aimed at providing an in-depth understanding of the embodiments. The embodiments may be obtained without one or more of the specific details, or with other methods. In other cases, known structures or operations are not illustrated or described in detail so that various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various points of the present description do not necessarily refer to one and the same embodiment. Moreover, particular conformations, structures, or characteristics may be combined in any suitable way in one or more embodiments, which may even differ from the ones described. The references used herein are provided merely for convenience and hence do not define the sphere of protection or the scope of the embodiments.

Represented schematically in FIG. 1a is an electrical-household-appliance system according to one embodiment of the invention, comprising an electrical appliance, here represented by a generic electrical household appliance 100, that is provided with a digital control system 110 and a control device 160, also defined hereinafter as "smart plug", here set between the supply cable 150 of the electrical household appliance and the corresponding current socket 190. The control device 160 is provided with a current socket 152 or the like, to be connected to which is the plug 151 of the supply cable of the electrical household appliance, or in any case the cable itself, and likewise has a plug 153 for connecting up, in turn, to the current socket 190. The control device 160 is moreover provided with interfacing means, here represented by a communication node 175, through which it can connect up to a communication network 180, in particular a local network. Also possibly connected to the local network 180 is an energy-manager device 185, of any known type, which performs the function of domestic energy manager.

Highlighted in the same FIG. 1a is the flow of the information 105 that, in a preferred embodiment of the invention, the electrical household appliance 100 sends periodically and in a spontaneous way to the control device 160. As will emerge more clearly hereinafter, the aforesaid information—regarding or in any case including the possibility or otherwise of external interruption of the supply in the period subsequent to their dispatch—are encoded in the form of pulses of current absorption that the control device 160 is able to measure and decode.

In a different embodiment of the invention, where the functions performed by the device 160 of FIG. 1a are integrated within a current socket 191 (referred to hereinafter also as "smart socket"), is represented in FIG. 1b. The current socket 191 is connected to the supply source, here represented by the electrical system of the environment in which it is located, through a connector 154 and is able, according to one embodiment of the invention, to measure consumption of electric power of the electrical household appliance 100 connected thereto, to detect the pulses of current absorption sent in coded form by the control system 110 of the electrical household appliance 100 itself, to decode the corresponding information, and possibly to share the aforesaid information with other devices through the local network 180 to which it is connected, preferably by means of the interface itself represented by the communication node 175.

The control system 110 of the electrical household appliance, represented in FIG. 2, sends information to the control device 160 or to the smart socket 191 by exploiting, according to the aforesaid preferred embodiment of the invention, the fact that the individual electrical loads of the electrical household appliance 100—one of which designated by 130—are managed through corresponding controllable switch means 125 that, on the basis of the control signal 120 managed by an actuator circuit 115 of the control system 110, receive or not the a.c. grid supply. In particular, and with reference to the schematic example represented, closing of the switch 125 causes application, across the electrical load 130, of the single-phase mains voltage associated to the cables 140 (Live) and 145 (Neutral) and consequently causes the aforesaid electrical load 130 to absorb current.

Encoded transmission of information by the electrical household appliance is obtained, according to a preferred embodiment of the invention, by acting in ON-OFF mode on the switch 125, which may be represented by the contact of an electromechanical relay or else by a TRIAC (i.e., a solid-state relay), so as to cause passage or otherwise of current on the electrical load 130 in the closed state or open state of the contact of the switch 125, respectively: the aforesaid sequences of ON and OFF activations are acquired and decoded by an external device of the type 160 or 191.

Figure 3B:
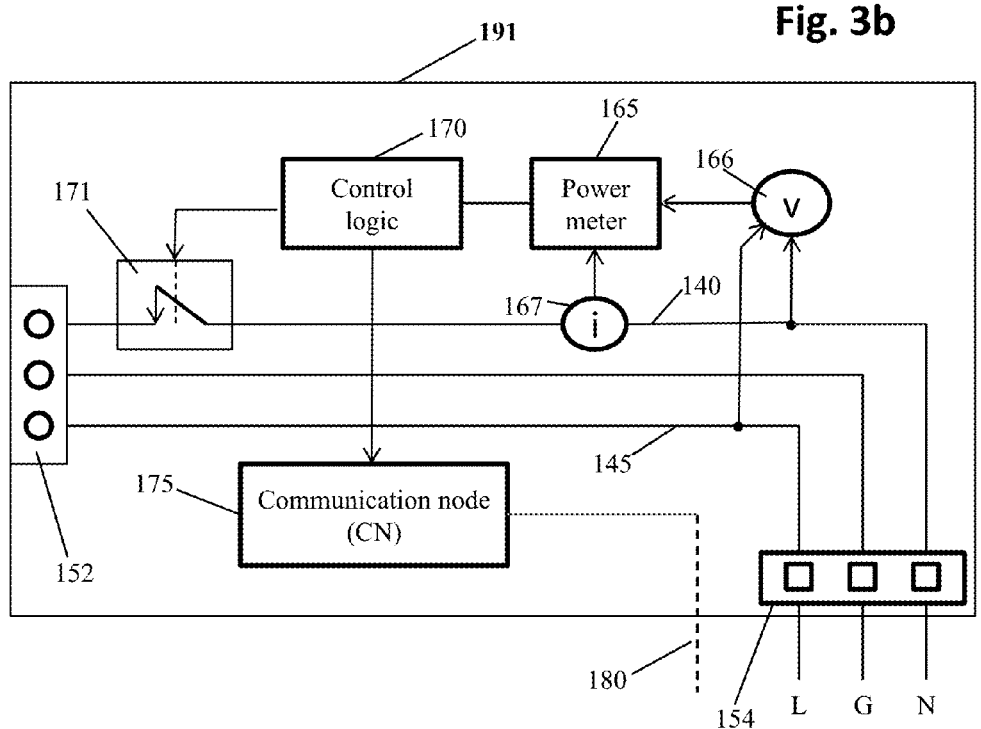

The devices 160 and 191, represented as a whole in FIGS. 3a and 3b, respectively, have available identical means for measuring the current absorptions of the corresponding electrical household appliance, here comprising a power meter 165, assisted by a voltage sensor 166 and by a current sensor 167. The devices 160 and 191 have the same control logic 170 for managing the closed or open state of the contact of a controllable switch 171, preferably a relay, have a similar current socket 152 or other connector to which to connect the supply cable 150-151 of the electrical household appliance and interface in the same way (use of a communication node 175) to a local network 180. What differentiates the two devices is just the fact that the former one, i.e., the control device 160, has means 153 (such as a three-pin current plug) for connecting up to a standard current socket, whereas the latter, i.e., the smart socket 191, is provided with terminals or the like for connecting up to a standard domestic electrical wiring system or a wiring system of the proprietary type, i.e., the voltage source: in the aforesaid perspective, the device 191 may be considered an advanced current socket.

In both cases, the communication node 175 maybe based upon radiofrequency (for example, WiFi, ZigBee, Z-Wave, etc.) or else upon powerline (KNX, LonTalk, Homeplug, etc.), whereas only in the case of the device 191 can it interface directly with a system bus on electrical cable, whether of the standard type or of a proprietary type.

There are multiple possibilities of encoding information through actions of an ON/OFF type carried out on an electrical load 130 belonging to an electrical household appliance, without thereby departing from the scope of the present invention.

In a particularly advantageous embodiment, which also includes the case where the switch 125 is represented by the contact of an electromechanical relay, the system for encoding the information sent by its own initiative by the electrical household appliance 100 is represented by a sequence of operations of closing and opening of the contact 125 associated to periods of variable duration, the useful information being contained in the duration of the aforesaid periods.

The above encoding mode proves suitable for all those cases where the electrical household appliance does not present an advanced control system, i.e., one that includes means necessary for implementing the communication technique described in the aforementioned WO 02/21664, EP 2189858 and in the corresponding article "*Connecting white goods to a home network at a very low cost*", which presuppose a high precision of measurement, for example of time (in terms of microseconds).

Figure 5:
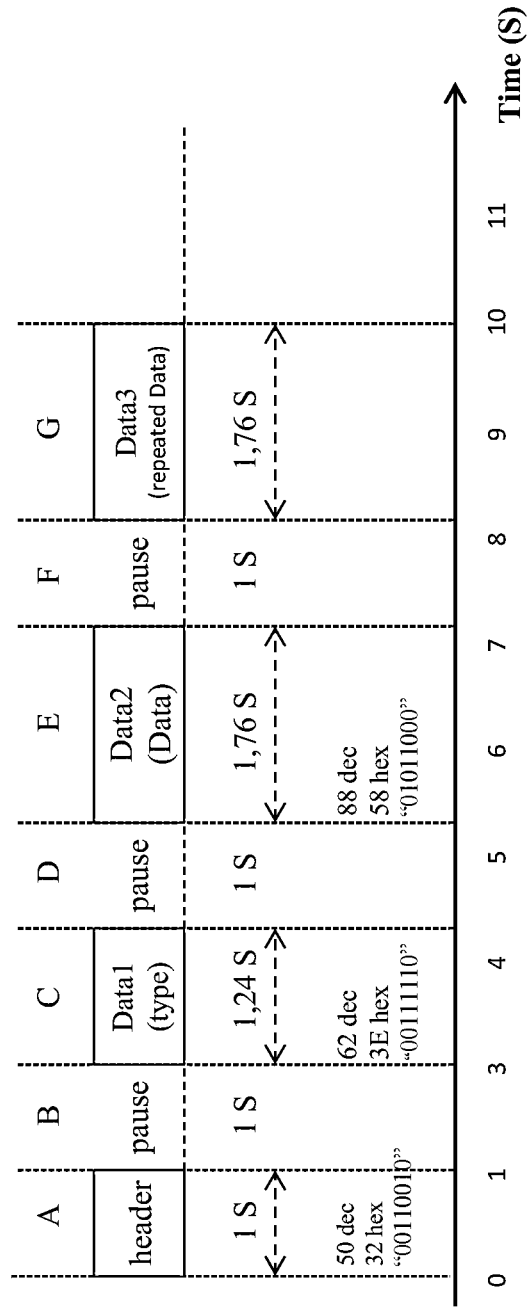
FIG. 5 represents an example of data transmission by the electrical household appliance according to one embodiment of the invention.

The modalities of encoding of the data sent by the electrical household appliance 100, based precisely upon the duration of the ON and OFF pulses applied to the electrical load 130, may be multiple. A possible implementation of data encoding, employed in the aforesaid particularly advantageous embodiment, is illustrated in FIG. 5, which represents a sequence of pulses of variable duration (this duration depending upon the value of the datum associated to each period) associated to the passage of current on the load 130 (corresponding to closing of the contact 125), interspersed by fixed pauses associated to opening of the contact 125. In particular, the first datum of start of transmission (header) is represented by a current pulse—deriving from application of the mains voltage across the load 130 through closing of the contact 125—of a duration of 1 s, corresponding to 50 grid cycles with a period of 20 ms (grid frequency of 50 Hz), which is followed, after a fixed pause of 1 s, by Data1, which indicates the type of datum (type) that will follow and that has been assumed as corresponding to the decimal number 62 ("3E" in hexadecimal format and "00111110" in binary format) and hence of a duration of $62 \times 20 \cdot 10^{-3} = 1.24$ s. After another pause of 1 s there follows Data2, which represents the useful datum to be transmitted, which, in the example considered, is 88 in decimal format ("58" in hexadecimal format and "01011000" in binary format), i.e., with a duration of $88 \times 20 \cdot 10^{-3} = 1.76$ s. This is followed, after a further pause of 1 s, by Data3, which replicates Data2 and concludes the transmission.

In general terms, then, the variable duration of the pulses depends upon the value of the datum to be transmitted and is preferentially a multiple—not necessarily an integer multiple—of the grid period. Previously, there has been exemplified an implementation in relation to a grid frequency of 50 Hz, but it is evident that the same concept may be applied also to the case of some other grid frequencies, typically 60 Hz. The variable duration of the above pulses can be measured by multiples of the grip period for mere practical reasons. However, as an alternative, the variable duration of the pulses associated to Data1, Data2 e Data3 can be easily defined by using one of the internal timers of the microcontroller of the control system of the electrical appliance, which timers are notoriously provided with a good precision due to their dependence from the oscillations of the quartz or ceramic oscillator that determines the clock of the same micro-controller.

The meaning of Data1, Data2 and Data3 may be obtained, according to the invention, using their respective value as pointer to an element of a corresponding table, common both to the electrical household appliance 100 and to the external control device 160 or 191, the contents of which represent, for the electrical household appliance, the datum sent to the external control device in coded form through appropriate sequences of power absorptions and, for the external control device, decoding of the value received.

Data1 serves, as has been said, to define the type of information or datum that is sent; for example, in one embodiment, Data1 may regard:

Case a. information regarding the authorization (authorization) or not by the electrical household appliance to interrupt its own supply through the external device 160 or 191;

Case b. information regarding the current operating status (status) of the electrical household appliance, which is useful, for example, for informing the consumer on the state of advance of a given program (washing program, if it is a washing machine or a dish-washer, or else cooking program, etc.) through the communication means of a home automation system connected to the local network 180 that sees the electrical household appliance itself as a peripheral device associated to its system;

Case c. information regarding an event of interaction (event) with the electrical household appliance by the consumer, the aforesaid useful information being, for example, in the case where a telemedicine system that uses the electrical household appliances as source of information on the daily behaviour of an infirm consumer who needs assistance is connected to the local network 180;

Case d. a statistical datum (statistic) regarding the work cycles performed by the electrical household appliance or other information deemed useful by the manufacturer of the electrical household appliance itself;

Case e. a diagnostic code (diagnostic) processed by the self-diagnosis system of the electrical household appliance, which is useful for remote assistance to the product;

Case f. the type of electrical household appliance (type), which is connected to the external device 160 or 191 (smart plug).

With reference to Case a (authorization), the device 160 or 191 can interrupt supply of the electrical household appliance in response to the possible request of a domestic or remote energy-management system, if and only if it is authorized directly by the electrical household appliance itself through the variable authorization. For this purpose, this variable may define different situations, such as the following ones, which are provided purely by way of non-limiting example (other criteria may be adopted by a person skilled in the art, without thereby departing from the teachings of the invention):

authorization for possible deactivation, expressed with a pulse (Data2) of given duration D1: in this case, the device 160 or 191 can freely remove supply from the electrical household appliance if this were requested by a possible energy manager 185;

prohibition of deactivation, expressed with a pulse (Data2) of given duration D2 longer than that of D1: in this case, the device 160 or 191 may not deactivate the electrical household appliance even though this were requested by the energy manager 185, but will merely inform the energy manager itself of the impossibility of executing the operation requested;

authorization conditioned by a delay, expressed with a pulse (Data2) of given duration D3 longer than that of D2: in this case, the duration of D3 represents the delay to be considered before deactivating the electrical household appliance.

Consequently, the operation of deactivation performed by the external device 160 or 191 through opening of the contact of the switch 171 (FIGS. 3*a* and 3*b*), is rendered operative if and only if the following two conditions are simultaneously satisfied:

the device 160 or 191 has received a command for deactivation of the electrical household appliance 100 by an energy manager 185; and the last information on the "degree of deactivatability", sent by the electrical household appliance before the device 160 or 191 were to receive the above command for deactivation, envisages authorization for interruption of the supply of the electrical household appliance itself.

Figure 4:
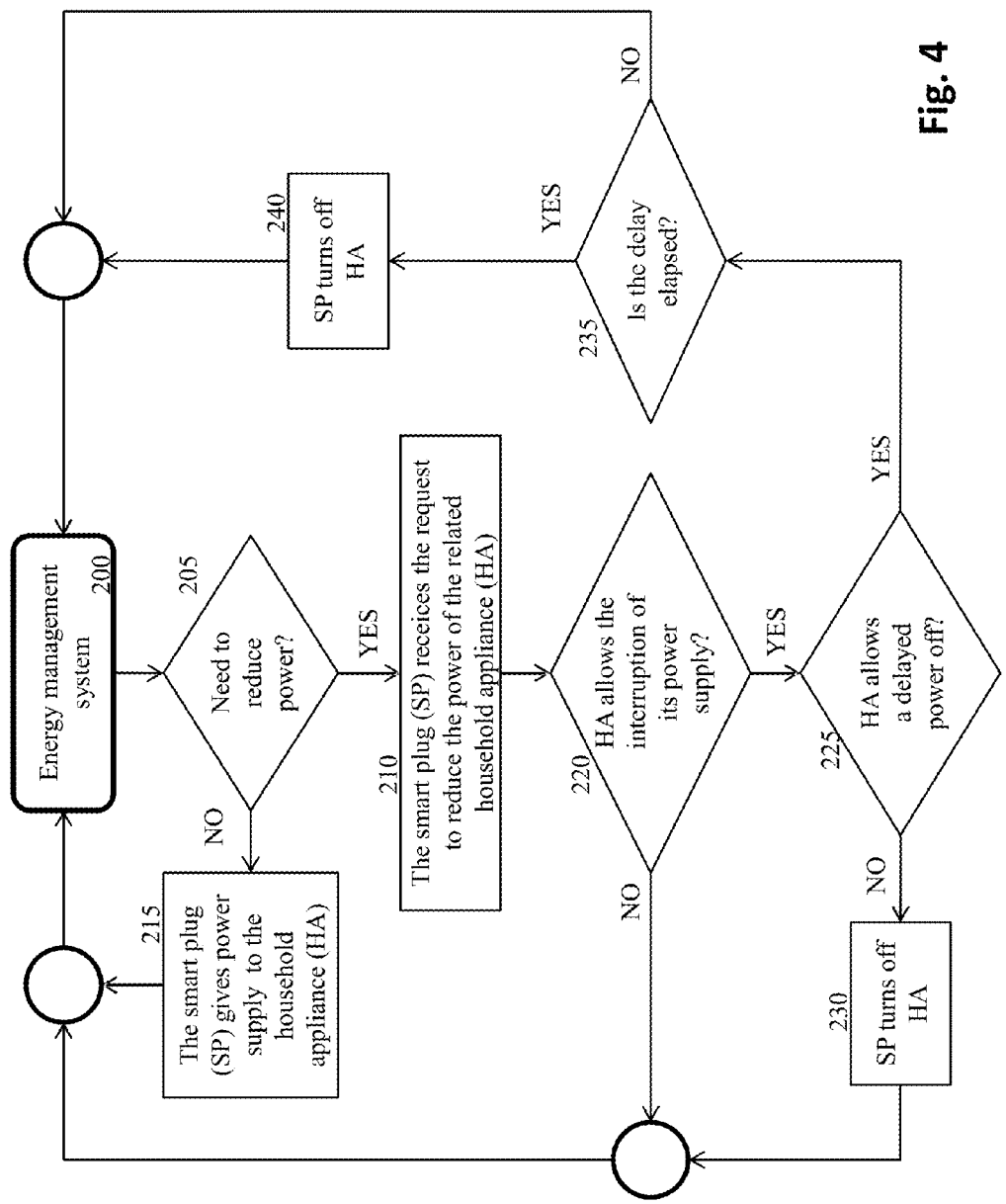
FIG. 4 is a flowchart that represents the process of management of levels of domestic energy consumption according to one embodiment of the invention.

On the basis of the criteria just described, the behaviour of the electrical household appliance 100 and of the corresponding device 160 or 191, in response to the possible requests of an energy-management system, is represented by the flowchart of FIG. 4, where the starting block 200 yields control to the testing block 205, which verifies the presence or otherwise of a request to the device 160 or 191, by the energy manager 185, for reduction of the power absorbed by the electrical household appliance. If there is no request in progress for reduction of consumption, control passes to block 215, which reasserts delivery of the mains supply to the electrical household appliance, and then returns to the initial block 200; otherwise, control passes to block 210, which confirms to the smart plug SP (device 160 or 191) the request for reduction of levels of current consumption by the energy manager 185 of the dwelling. Control then passes to the testing block 220, which verifies whether the electrical household appliance HA (Home Appliance) has authorized its own possible deactivation. In the case of non-authorization, the smart plug does not interrupt supply of the electrical household appliance, and control returns to the initial block 200; otherwise (case of full authorization or authorization conditioned by delay), control passes to the subsequent testing block 225, which verifies whether the electrical household appliance HA has authorized a possible delayed deactivation. If it has not, the smart plug interrupts supply of the electrical household appliance, and control returns to the initial block 200; otherwise (case of authorization with delay), control passes to the testing block 235, which verifies whether the delay of deactivation requested by the electrical household appliance has already elapsed. If it has not, the smart plug does not interrupt supply of the electrical household appliance, and control returns to the initial block 200; otherwise (case where the delay requested by the electrical household appliance has already elapsed), the smart plug interrupts supply to the electrical household appliance, and control returns to the initial block 200.

With reference to Case b (status), the electrical household appliance notifies its operating state, which may, for example, be the step of advance of a washing program or cooking program, or the like, depending upon the type of electrical household appliance. The aforesaid information is updated, in a preferred embodiment, at each change of status by the electrical household appliance. The information on status is very useful, above all when the electrical household appliance forms part of a home automation system in so far as it enables the aforesaid system to keep the consumer informed, through the interaction means that it has available (for example, a display device interfaced with the network 180), as regards the state of advance of a given program associated to the electrical household appliance itself (of particular interest, for example, is the state of "end of program", which warns the consumer that cooking is through and lunch is ready, or else that washing is completed and it is possible to iron the garments that have just been washed). In this case, the duration of the pulse (Data2) represents in coded form the new status assumed by the electrical household appliance.

With reference to Case c (event), the electrical household appliance notifies the occurrence of an interaction event with the consumer (for example, opening of the door of the refrigerator, activation of a washing program, activation of a cooking program, and so forth). This type of information is particularly useful if the electrical household appliance is used also as "vitality sensor" in the context of a telemedicine system: in this case, in fact, it can supply indications on the daily behaviour of an infirm consumer (for example, an elderly person suffering from Alzheimer's disease), contributing to the study of his or her behavioural habits and to the identification of possible anomalous behaviour that may point to worsening of a disease or the sign of an incipient disease. In this case, the duration of the pulse (Data2) expresses the type of event that has occurred.

With reference to Case d (statistic), the electrical household appliance supplies indications, for example on the type of program in progress; this may be useful to the manufacturer as statistical datum that provides information on the frequency and modalities of use of the product, this information being useful for carrying out possible modifications to improve the product and also to improve assistance thereof: thanks to this information, it is possible, in fact, to estimate the "state of wear" of the electrical household appliance and, if necessary, to intervene with operations of preventive maintenance. In this case, the duration of the pulse (Data2) identifies the type of the current program executed by the electrical household appliance.

With reference to Case e (diagnostic), the electrical household appliance sends a possible fault code or warning code, detected by its internal self-diagnosis system. The fault code identifies a specific failure that requires immediate intervention of technical assistance, whereas the warning code signals a less serious problem, which does not cause interruption of the service offered by the product, but may degrade performance thereof. This is all very useful for providing the consumer with a good service of remote assistance. In this case, the duration of the pulse (Data2) is associated to the code that identifies the diagnostic event (fault or warning) detected.

Finally, with reference to Case f (type), the electrical household appliance communicates its identity (refrigerator, fridge-freezer, dish-washer, washing machine, dryer, oven, cooking hob, suction hood, and so forth) so that the device 160 or 191 can interpret correctly all the information that this will send to it. The aforesaid operation may, for example, be carried out at each power-on operation of the electrical household appliance. In this case, the duration of the pulse (Data2) is associated to the code that identifies the type of the electrical household appliance.

To return once again to the example of FIG. 5, the useful datum expressed by Data2 is associated to a current pulse of a duration of 1.76 s, corresponding to 88 grid cycles ("58" in hexadecimal format, "01011000" in binary format), and expresses a given value, the meaning of which depends upon the encoding rules adopted and upon the meaning of Data1 (type of information transmitted). Finally, the duration of the last pulse (Data3) coincides deliberately with that of the preceding pulse (Data2) and represents a way for verifying proper reception of the latter and also for signalling the end of transmission.

The advantages of the invention as compared to a smart-plug system of a traditional type are evident. Assume the case where:
the electrical household appliance is represented by a washing machine that is carrying out a washing cycle at 60° C.;
forced interruption of supply must occur in the proximity of conclusion of a step of heating of the washing water, for example when the temperature of the water has reached 59° C.; and
the aforesaid interruption must persist for such a time that the temperature itself drops to 40° C.

In a traditional system, the electrical supply to the machine would simply be interrupted and, upon reactivation of the supply, the control system of the machine would have to recover the 19° C. lost, by re-activating the heating resistance to reach the target value of 60° C. There follows an evident inefficiency, due to the need to heat the washing water once again, in addition to a prolongation of the duration of the washing cycle itself caused by the time required by the new heating operation. The consumer is consequently put at a disadvantage, whereas the utility will, instead, have obtained the dual advantage of reducing power consumption in a peak period and of billing the consumer for a larger amount of electrical energy.

In the system according to the invention, instead, the machine can oppose its turning-off and can carry through the step of heating of the water, and then pass on to the step of simple washing (rotation back and forth of the drum), which involves a power absorption ten times lower than what is required during the preceding heating step (and hence substantially of no effect for the purposes of management of domestic consumption peaks).

Figure 6:
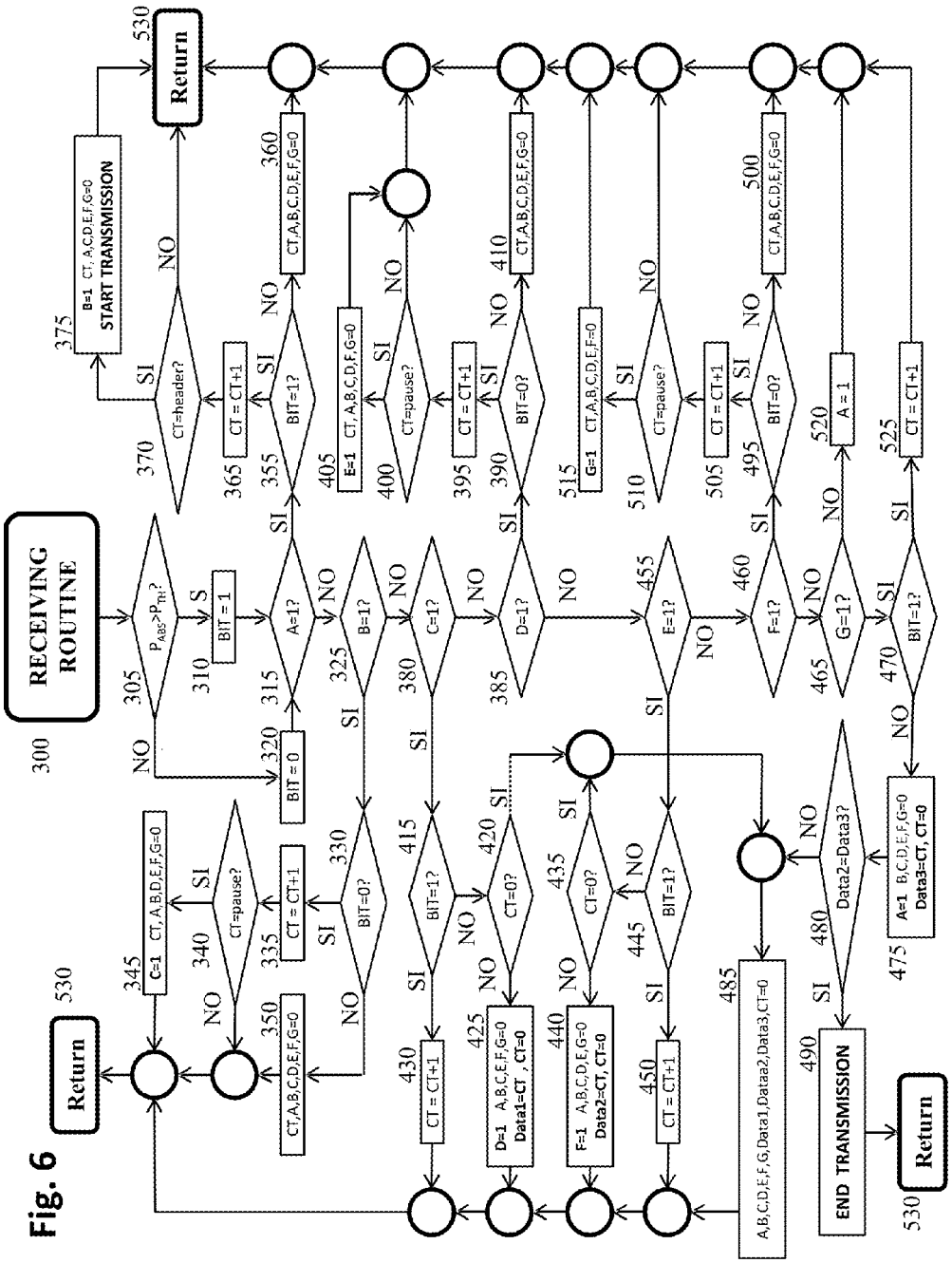
FIG. 6 is a flowchart of a possible routine of reception, by the control device (160 or 191), of the data sent by the electrical household appliance (100) in the form of current absorptions, according to one embodiment of the invention.

Represented in FIG. 6 is a flowchart of a non-limiting example of routine of reception, by the device 160 or 191, of the data transmitted by the electrical household appliance in the form of current absorptions, according to an embodiment of the invention. The aforesaid routine uses variables, here designated by A, B, C, D, E, F, and G, referred to as "step variables" since they are associated to the various steps of a transmission represented in FIG. 5, and assigns the value 1 (blocks 475 and 520 for the variable A, block 375 for the variable B, block 345 for the variable C, block 425 for the variable D, block 405 for the variable E, block 440 for the variable F, and block 515 for the variable G) to the variable corresponding to the current transmission step according to the diagram of FIG. 5, all the other variables being set at zero.

The routine is called by the control system of the device 160 or 191 at fixed time intervals, for example coinciding with the grid period (20 ms in the case of a frequency of 50 Hz, as represented in FIG. 5), and the measurement of the duration of the individual transmission steps is obtained by adding—using the counter CT (blocks 365, 335, 430, 395, 450, 505 and 525, corresponding, respectively, to steps A, B, C, D, E, F, and G)—the grid period associated to each call of the routine. The first operation performed by the device 160 or 191 on the occasion of each call of the reception routine consists in comparing the power $P_{ABS}$ absorbed by the electrical household appliance in that grid period with a given power threshold $P_{TH}$ assumed as reference. On the basis of the result of the comparison, the variable BIT is set at 1 if $P_{ABS}>P_{TH}$ or else at zero otherwise (blocks 305, 310, 315, 320) and then control passes to identifying the current transmission step (testing blocks 315, 325, 380, 385, 455, 460 and 465), distinguished by the value 1 of the step variable where operations consistent with the value assumed by the aforesaid variable BIT are performed (testing blocks 335, 330, 415, 390, 445, 495 and 470). In particular, the sync signal "header" of start of transmission by the electrical household appliance (step A) is recognized by blocks 355-365-370-375, the duration of the first fixed pause (step B) is verified by blocks 330-335-340-345, the duration of Data1 (step C) is identified by blocks 415-420-425, the duration of the second fixed pause (step D) is verified by blocks 390-395-400-405, the duration of Data2 (step E) is identified by blocks 445-435-440, the duration of the third fixed pause (step F) is verified by blocks 495-505-510-515, and finally the duration of Data3 (step G) is identified by blocks 470-475. If the value of Data3 coincides with the value of Data2 (testing block 480), the transmission concludes positively, and the data received are contained in the variables Data1 and Data2; in all the other situations, no datum is received by the device 160 or 191, and the variables involved are set to zero (blocks 360, 350, 485, 410 and 500).

In practice, the device 160 or 191 performs the following functions:
- it constantly measures the power-absorption levels of the electrical household appliance 100;
- it identifies, acquires, and decodes possible information sent in a spontaneous manner by the electrical household appliance through variations of power absorption made by operations of the ON/OFF type on an electrical load 130 thereof in any of the modalities envisaged according to the invention; and
- it renders operative a possible request for deactivation of the corresponding electrical-household-appliance 100 by an energy manager 185 present in the same domestic environment, if and only if the electrical-household-appliance itself has previously been authorized to do so.

From the above description the characteristics of the present invention are clear, as well as its advantages. Among the advantages it should be highlighted how the solution according to the invention does not provides for any preventive requests to the electrical appliance of a switching-off authorization, by the external control device: on the contrary, it is the same electrical appliance that spontaneously sends information to the external device regarding its "degree of deactivatability", with a unidirectional communication.

In the preferential encoding system of information sent by the electrical appliance, the sequences of activation ON-OFF of the electrical load (that is, the operation of closing and opening of the contact 125) are referred to relatively long periods, that is having duration in the order of one second, and are thus manageable in a simple manner, even via a customary and cheap electromechanical relay, without any risks of alteration of the waveform of the supply voltage and of generation of spurious harmonics; additionally, since the aforesaid activations ON-OFF referred to periods having a variable duration, the transmitted information is encoded in decimal and contained just in said durations.

As seen above, in a preferred embodiment, the control system f the external device (160 o 191) is configured for causing opening of its controllable switch (171), in consequence of a request to this purpose coming from the external communication network (180), is and only if the electrical appliance has previously and spontaneously allowed the authorization: thus, advantageously such a control system does not require to be also prearranged for generating a deactivation request for the electrical appliance and its means for setting up a communication line with the same appliance are of a monodirectional type, i.e., the consist of an arrangement for the reception only (which, in the described example, is represented by a power meter).

It is evident that numerous variations are possible for encoding information by acting on the switch 125 in ON-OFF mode, combining, for example, pulses both of fixed duration and of variable duration, without thereby departing from the scope of the present invention. Moreover, the six different meanings associated to Data1 (authorization, status, event, statistic, diagnostic, type) are only some important examples of the possible types of information that an electrical household appliance can communicate to the outside world by means of the method described above, it obviously being possible to send with the same method also other types of information deemed useful, without thereby departing from the sphere of protection of the present invention.

In one embodiment, the control system 110 of the electrical appliance 100 can also be configured, not only for reducing or nullifying its own power absorption, but also for sending a message 105, in which it specifies, for example, the duration of the reduction of the consumption levels implemented.

The invention claimed is:

1. An electrical household appliance system that comprises:
    an electrical appliance, having at least one electrical load and a digital control system that manages flows of electric current of supply of the at least one electrical load; and
    a control device operatively set between an electrical-supply line of the electrical appliance and a corresponding electric voltage-supply source, the control device having a digital control system with a first controllable switch for managing in ON-OFF mode the electric voltage from the supply source to the electrical appliance;
    wherein the digital control system of the control device interfaces to a communication network and receives through said communication network instructions for switching the first controllable switch;
    wherein the digital control system of the electrical appliance transmits information spontaneously, and the digital control system of the control device receives said information;
    wherein said information comprises first information regarding authorization or non-authorization to an interruption of the supply of electric voltage to the electrical appliance by the control device, the digital control system of the electrical appliance generating the first information of its own operating state; and
    wherein the digital control system of the control device causes switching of the first controllable switch as a function of one said instruction for switching and said first information.

2. The system of claim 1, wherein:
    the digital control system of the electrical appliance transmits said information through its own electrical-supply line, said information being encoded by controlled variations of said flows of electric current performed via the managing; and
    the digital control system of the control device receives said information, measures variations of the electric current absorbed by the electrical appliance, and decodes said information encoded through said controlled variations of said flows of electric current.

3. The system of claim 2, wherein the managing comprises a second controllable switch of the electrical appliance, and the digital control system of the electrical appliance encodes said information via a sequence of actions of closing and opening of the second controllable switch associated to periods of variable duration, the information being in particular associated to the duration of said periods.

4. The system of claim 3, wherein encoding of said information comprises a sequence of pulses of variable duration associated to the passage of electric current on the at least one electrical load, interspersed by fixed pauses associated to opening of the second controllable switch.

5. The system of claim 4, wherein encoding of said information includes at least:
- a first datum of start of transmission represented by a current pulse of a first duration, followed by a fixed pause;
- a second datum indicating the type of information represented by a current pulse having a duration depending upon a first value to be transmitted, followed by a fixed pause;
- a third datum indicating the contents of the information represented by a current pulse having a duration depending upon a second value to be transmitted, followed by a fixed pause; and
- a fourth datum that replicates the third datum and concludes the transmission.

6. The system of claim 1, wherein the digital control system of the electrical appliance transmits said information at changes of status of the electrical appliance.

7. The system of claim 1, wherein the digital control system of the electrical appliance transmits said information periodically.

8. The system of claim 1, wherein said information comprises one or more second information comprising at least one of a type of electrical appliance, an operating status of the electrical appliance, events of interaction of a consumer with the electrical appliance, statistical data on frequency and/or mode of use of the electrical appliance, and/or diagnostic data generated by a system of self-diagnosis of the electrical appliance.

9. The system of claim 1, wherein said first information comprises at least one of:
- an authorization for interruption of the supply of electric voltage to the electrical appliance;
- a prohibition for interruption of the supply of electric voltage to the electrical appliance; and/or
- an authorization for interruption of the supply of electric voltage to the electrical appliance conditioned by a delay, the first information preferably including the length of said delay.

10. The system of claim 1, wherein the digital control system of the control device makes available said information on said communication network via said interfacing.

11. The system of claim 1, wherein the control device connects to said supply line of the electrical appliance and connects to said supply source.

12. The system of claim 1, wherein the control device is configured as a movable device, which can be connected between a supply cable of the electrical appliance and a current socket, or else is integrated in a current socket.

13. A method for control of power consumption in a domestic environment, the method comprising:
- providing an electrical appliance;
- providing a control device between an electrical-supply line of the electrical appliance and a corresponding electric voltage-supply source, the control device being able to cause an interruption of the supply of electric voltage from said supply source to said supply line via a first controllable switch; and
- coupling the control device to a communication network for receiving therefrom instructions for switching the first controllable switch;
- wherein the electrical appliance is capable of transmitting information to the control device spontaneously;
- wherein said information comprises first information regarding authorization or non-authorization for an interruption of the supply of electric voltage to the electrical appliance by the control device, the electrical appliance generating the first information of its own operating state; and
- wherein the control device provides for interrupting or not interrupting the supply of electric voltage to the electrical appliance of one said instruction for switching and said first information.

14. A control device for an electrical household appliance system operatively set between an electrical supply line of an electrical appliance and a corresponding electric voltage supply source, the control device having a digital control system with a first controllable switch for managing in an ON-OFF mode the electric voltage from the supply source to the electrical appliance:
- wherein the digital control system interfaces to a communication network and receives via said communication network instructions for switching of the first controllable switch;
- wherein the digital control system of the control device sets up a communication line with the electrical appliance;
- wherein said communication line is unidirectional and consists of a receiver; and
- wherein the digital control system causes switching of the first controllable switch as a function a first information transmitted spontaneously by the electrical appliance, relating to authorization or non-authorization to an interruption of the supply of electric voltage thereof.

15. An electrical household appliance system that comprises:
- an electrical appliance, having at least one electrical load and a digital control system that manages flows of electric current of supply of the at least one electrical load; and
- a control device operatively set between an electrical-supply line of the electrical appliance and a corresponding electric voltage-supply source, the control device having a digital control system with a first controllable switch for managing in ON-OFF mode the electric voltage from the supply source to the electrical appliance;
- wherein the digital control system of the control device interfaces to a communication network and receives through said communication network instructions for switching the first controllable switch;
- wherein the digital control system of the electrical appliance transmits information, and the digital control system of the control device receives said information, said information being encoded by controlled variations of said flows of electric current performed via the managing;
- wherein said information comprises first information regarding authorization or non-authorization to an interruption of the supply of electric voltage to the electrical appliance by the control device, the digital control system of the electrical appliance generating the first information of its own operating state;

wherein the digital control system of the control device causes switching of the first controllable switch as a function of one said instruction for switching and said first information; and wherein encoding of said information includes at least:
- a first datum of start of transmission represented by a current pulse of a first duration, followed by a fixed pause;
- a second datum indicating the type of information represented by a current pulse having a duration depending upon a first value to be transmitted, followed by a fixed pause;
- a third datum indicating the contents of the information represented by a current pulse having a duration depending upon a second value to be transmitted, followed by a fixed pause; and
- a fourth datum that replicates the third datum and concludes the transmission.

\* \* \* \* \*